United States Patent
Dorsey et al.

(10) Patent No.: US 10,614,445 B1
(45) Date of Patent: Apr. 7, 2020

(54) PROXIMITY-BASED PAYMENTS

(71) Applicant: Square, Inc., San Francisco, CA (US)

(72) Inventors: Jack Dorsey, San Francisco, CA (US); Brian Grassadonia, San Francisco, CA (US); Robert Andersen, Brooklyn, NY (US)

(73) Assignee: Square, Inc., San Francisco, CA (US)

( * ) Notice: Subject to any disclaimer, the term of this patent is extended or adjusted under 35 U.S.C. 154(b) by 487 days.

(21) Appl. No.: 14/296,385

(22) Filed: Jun. 4, 2014

(51) Int. Cl.
*G06Q 20/32* (2012.01)
*G06Q 20/10* (2012.01)
*G06Q 20/40* (2012.01)

(52) U.S. Cl.
CPC ........... *G06Q 20/327* (2013.01); *G06Q 20/10* (2013.01); *G06Q 20/3255* (2013.01); *G06Q 20/40* (2013.01)

(58) Field of Classification Search
None
See application file for complete search history.

(56) References Cited

U.S. PATENT DOCUMENTS

| | | | |
|---|---|---|---|
| 4,838,384 A | 6/1989 | Thangavelu | |
| 5,506,898 A | 4/1996 | Costantini et al. | |
| 6,707,905 B2 | 3/2004 | Lenard | |
| 6,829,583 B1 | 12/2004 | Knapp et al. | |
| 6,839,566 B2 | 1/2005 | Casaccia et al. | |
| 6,876,993 B2 | 4/2005 | LaButte et al. | |
| 7,089,208 B1 | 8/2006 | Levchin et al. | |
| 7,254,406 B2 * | 8/2007 | Beros | H04L 29/06 455/41.2 |
| 7,349,871 B2 | 3/2008 | Labrou et al. | |

(Continued)

FOREIGN PATENT DOCUMENTS

WO    2016/069958 A1    5/2016

OTHER PUBLICATIONS

Cover, T. M., and Thomas, J. A., "Elements of Information Theory," John Wiley and Sons, Inc. Publication, New York (1991), pp. 1-140, at http://www.cs-114.org/wp-content/uploads/2015/01/Elements_of_Information_Theory_Elements.pdf. [Part—1].

(Continued)

*Primary Examiner* — Christopher Bridges
(74) *Attorney, Agent, or Firm* — Baker Botts L.P.

(57) ABSTRACT

Techniques are disclosed for facilitating customers' mobile devices to conduct proximity-based payments to reduce the friction of conducting payments from one party to another. In some embodiments, a customer's mobile device can detect another mobile device that is in proximity. For example, the detected device may be in the same wireless personal area network as the customer's device. The customer's device can verify with a payment service system (PSS) that the detected device is associated with a financial account. The customer's device can prompt, via a user interface, the customer to select the detected mobile device for a payment. The customer's device can also confirm an amount for the payment with the customer. Thereafter, the customer's device can cause (e.g., by transmitting communication signals to the PSS) the amount to be transferred from a financial account associated with the customer's device to the financial account associated with the detected device.

30 Claims, 13 Drawing Sheets

(56) References Cited

U.S. PATENT DOCUMENTS

| | | | |
|---|---|---|---|
| 7,376,587 B1* | 5/2008 | Neofytides | G06Q 20/02 705/26.35 |
| 7,580,719 B2 | 8/2009 | Karmarkar | |
| 7,606,734 B2* | 10/2009 | Baig | G06Q 20/02 705/26.35 |
| 7,620,404 B2* | 11/2009 | Chesnais | H04W 4/02 455/414.2 |
| 7,694,287 B2 | 4/2010 | Singh et al. | |
| 7,783,537 B1 | 8/2010 | Van Luchene et al. | |
| 8,010,601 B2* | 8/2011 | Jennings | H04W 4/02 709/203 |
| 8,090,616 B2* | 1/2012 | Proctor, Jr. | H04W 4/029 705/21 |
| 8,208,388 B2 | 6/2012 | Casaccia et al. | |
| 8,385,964 B2* | 2/2013 | Haney | H04W 12/08 455/404.1 |
| 8,571,975 B1 | 10/2013 | Lehman et al. | |
| 8,606,703 B1 | 12/2013 | Dorsey et al. | |
| 8,661,046 B2 | 2/2014 | King et al. | |
| 8,694,435 B1 | 4/2014 | Bishop | |
| 8,751,379 B1 | 6/2014 | Bueche, Jr. | |
| 8,762,272 B1 | 6/2014 | Cozens et al. | |
| 9,264,850 B1* | 2/2016 | Lee | H04W 4/023 |
| 9,710,821 B2 | 7/2017 | Heath | |
| 9,715,709 B2 | 7/2017 | Carlson | |
| 9,767,443 B1 | 9/2017 | Wilson et al. | |
| 9,799,071 B1 | 10/2017 | Wilson et al. | |
| 9,805,358 B2 | 10/2017 | Green et al. | |
| 2001/0014878 A1 | 8/2001 | Mitra et al. | |
| 2002/0114442 A1 | 8/2002 | Lieberman et al. | |
| 2003/0037074 A1 | 2/2003 | Dwork et al. | |
| 2003/0045272 A1* | 3/2003 | Burr | H04L 63/101 455/411 |
| 2003/0061170 A1 | 3/2003 | Uzo | |
| 2003/0120936 A1 | 6/2003 | Farris et al. | |
| 2004/0039630 A1 | 2/2004 | Begole et al. | |
| 2004/0148252 A1* | 7/2004 | Fleishman | G06Q 20/40 705/39 |
| 2004/0177005 A1 | 9/2004 | Poltorak | |
| 2004/0264466 A1* | 12/2004 | Huang | H04L 45/123 370/392 |
| 2005/0174975 A1* | 8/2005 | Mgrdechian | G06Q 30/0207 370/338 |
| 2005/0286686 A1 | 12/2005 | Krstulich | |
| 2006/0148532 A1* | 7/2006 | Schnurr | H04W 4/02 455/567 |
| 2006/0224542 A1 | 10/2006 | Yalamanchi | |
| 2006/0235796 A1 | 10/2006 | Johnson et al. | |
| 2006/0277550 A1 | 12/2006 | Williams et al. | |
| 2007/0124721 A1* | 5/2007 | Cowing | G06F 17/30041 717/100 |
| 2007/0136118 A1 | 6/2007 | Gerlach et al. | |
| 2007/0203836 A1 | 8/2007 | Dodin | |
| 2007/0208816 A1* | 9/2007 | Baldwin | G06Q 10/107 709/206 |
| 2007/0255652 A1 | 11/2007 | Tumminaro et al. | |
| 2007/0255653 A1* | 11/2007 | Tumminaro | G06Q 20/10 705/39 |
| 2007/0265984 A1* | 11/2007 | Santhana | G06Q 20/10 705/65 |
| 2008/0010190 A1* | 1/2008 | Rackley, III | G06Q 20/042 705/39 |
| 2008/0154798 A1 | 6/2008 | Valz | |
| 2008/0162340 A1 | 7/2008 | Zimmer et al. | |
| 2008/0182591 A1* | 7/2008 | Krikorian | H04W 68/00 455/456.3 |
| 2009/0063353 A1* | 3/2009 | Viidu | G06Q 20/04 705/75 |
| 2009/0070263 A1* | 3/2009 | Davis | G06Q 20/10 705/44 |
| 2009/0157652 A1 | 6/2009 | Barbosa et al. | |
| 2009/0164374 A1 | 6/2009 | Shastry | |
| 2009/0281817 A1 | 11/2009 | Ferrara et al. | |
| 2010/0082481 A1* | 4/2010 | Lin | G06Q 20/042 705/41 |
| 2010/0169264 A1 | 7/2010 | O'Sullivan et al. | |
| 2010/0211592 A1 | 8/2010 | Brownlee | |
| 2010/0211938 A1 | 8/2010 | Singh et al. | |
| 2010/0250682 A1 | 9/2010 | Goldberg et al. | |
| 2010/0268648 A1 | 10/2010 | Wiesman et al. | |
| 2010/0312626 A1 | 12/2010 | Cervenka | |
| 2011/0078260 A1 | 3/2011 | Rashad et al. | |
| 2011/0087742 A1 | 4/2011 | Deluca et al. | |
| 2011/0119190 A1 | 5/2011 | Mina | |
| 2011/0178883 A1* | 7/2011 | Granbery | G06Q 20/10 705/16 |
| 2011/0231292 A1* | 9/2011 | McCown | G06Q 20/223 705/27.1 |
| 2011/0251892 A1 | 10/2011 | Laracey | |
| 2012/0054102 A1 | 3/2012 | Schwartz et al. | |
| 2012/0130903 A1 | 5/2012 | Dorsey et al. | |
| 2012/0158589 A1 | 6/2012 | Katzin et al. | |
| 2012/0209749 A1 | 8/2012 | Hammad et al. | |
| 2012/0246252 A1 | 9/2012 | Denise | |
| 2012/0253852 A1 | 10/2012 | Pourfallah et al. | |
| 2012/0259782 A1 | 10/2012 | Hammad | |
| 2013/0024506 A1 | 1/2013 | Setton | |
| 2013/0060708 A1* | 3/2013 | Oskolkov | G06Q 20/10 705/75 |
| 2013/0085931 A1* | 4/2013 | Runyan | G06Q 20/322 705/40 |
| 2013/0110656 A1 | 5/2013 | Chau et al. | |
| 2013/0132502 A1* | 5/2013 | Stacey | H04W 56/0015 709/208 |
| 2013/0229930 A1* | 9/2013 | Akay | H04W 52/0245 370/252 |
| 2013/0275301 A1 | 10/2013 | Lehman et al. | |
| 2013/0290234 A1 | 10/2013 | Harris et al. | |
| 2013/0316808 A1 | 11/2013 | Nelson et al. | |
| 2014/0025958 A1 | 1/2014 | Calman | |
| 2014/0046851 A1 | 2/2014 | Lehman et al. | |
| 2014/0108247 A1* | 4/2014 | Artman | H04W 76/10 705/44 |
| 2014/0181934 A1 | 6/2014 | Mayblum et al. | |
| 2014/0207679 A1 | 7/2014 | Cho | |
| 2014/0254575 A1* | 9/2014 | Venkatraman | H04W 8/005 370/338 |
| 2014/0279436 A1 | 9/2014 | Dorsey et al. | |
| 2014/0279444 A1* | 9/2014 | Kassemi | G06Q 20/102 705/39 |
| 2014/0279447 A1 | 9/2014 | Dorsey et al. | |
| 2014/0279474 A1 | 9/2014 | Evans et al. | |
| 2014/0279556 A1 | 9/2014 | Priebatsch et al. | |
| 2014/0304510 A1 | 10/2014 | Sannegowda et al. | |
| 2014/0348143 A1 | 11/2014 | Kato et al. | |
| 2014/0372308 A1 | 12/2014 | Sheets | |
| 2015/0031393 A1* | 1/2015 | Post | H04W 4/025 455/456.2 |
| 2015/0081462 A1 | 3/2015 | Ozvat et al. | |
| 2015/0100482 A1* | 4/2015 | Zamer | G06Q 20/102 705/40 |
| 2015/0170092 A1 | 6/2015 | Klein | |
| 2015/0186887 A1* | 7/2015 | Khan | G06Q 20/3226 705/71 |
| 2015/0358476 A1 | 12/2015 | Flores-Estrada | |
| 2016/0019536 A1 | 1/2016 | Ortiz et al. | |
| 2016/0117670 A1 | 4/2016 | Davis | |
| 2016/0125369 A1 | 5/2016 | Grassadonia et al. | |
| 2016/0277560 A1* | 9/2016 | Gruberman | H04W 8/245 |

OTHER PUBLICATIONS

Cover, T. M., and Thomas, J. A., "Elements of Information Theory," John Wiley and Sons, Inc. Publication, New York (1991), pp. 141-281, at http://www.cs-114.org/wp-content/uploads/2015/01/Elements_of_Information_Theory_Elements.pdf. [Part—2].

Cover, T. M., and Thomas, J. A., "Elements of Information Theory," John Wiley and Sons, Inc. Publication, New York (1991), pp. 282-419, at http://www.cs-114.org/wp-content/uploads/2015/01/Elements_of_Information_Theory_Elements.pdf. [Part—3].

(56) References Cited

OTHER PUBLICATIONS

Cover, T. M., and Thomas, J. A., "Elements of Information Theory," John Wiley and Sons, Inc. Publication, New York (1991), pp. 420-563, at http://www.cs-114.org/wp-content/uploads/2015/01/Elements_of_Information_Theory_Elements.pdf. [Part—4].
Derouault, A. M., and Merialdo, B., "Probabilistic grammar for phonetic to French transcription," ICASSP '85, IEEE International Conference on Acoustics, Speech, and Signal Processing, pp. 1577-1580 (1985), at https://ieeexplore.ieee.org/abstract/document/1168078/.
Magerman, D.M., "Natural Language Parsing as Statistical Pattern Recognition," PhD Thesis, Stanford University, dated Feb. 1994, pp. 1-158.
Magerman, D.M., "Parsing as Statistical Pattern Recognition," IBM T. J. Watson Research Center, dated Jan. 16, 1995, pp. 1-15.
Non-Final Office Action dated Jan. 5, 2015 for U.S. Appl. No. 14/284,227, of Wilson, J., et al., filed May 21, 2014.
Final Office Action dated Jun. 25, 2015 for U.S. Appl. No. 14/284,227, of Wilson, J., et al., filed May 21, 2014.
Non-Final Office Action dated Feb. 2, 2016, for U.S. Appl. No. 14/754,223, of Grassadonia, B., et al., filed Jun. 29, 2015.
Non-Final Office Action dated Mar. 24, 2016 for U.S. Appl. No. 14/284,227, of Wilson, J., et al., filed May 21, 2014.
Non-Final Office Action dated Mar. 25, 2016, for U.S. Appl. No. 14/276,659, of Wilson, J., et al., filed May 13, 2014.
Final Office Action dated Aug. 12, 2016, for U.S. Appl. No. 14/754,223, of Grassadonia, B., et al., filed Jun. 29, 2015.
Non-Final Office Action dated Aug. 30, 2016, for U.S. Appl. No. 14/444,741, of Seemann, D., et al., filed Jul. 28, 2014.
Final Office Action dated Sep. 29, 2016, for U.S. Appl. No. 14/276,659, of Wilson, J., et al., filed May 13, 2014.
Final Office Action dated Oct. 6, 2016 for U.S. Appl. No. 14/284,227, of Wilson, J., et al., filed May 21, 2014.
Advisory Action dated Dec. 15, 2016, for U.S. Appl. No. 14/754,223, of Grassadonia, B., et al., filed Jun. 29, 2015.
Advisory Action dated Jan. 12, 2017 for U.S. Appl. No. 14/284,227, of Wilson, J., et al., filed May 21, 2014.
Non-Final Office Action dated Jan. 20, 2017, for U.S. Appl. No. 14/276,659, of Wilson, J., et al., filed May 13, 2014.
Notice of Allowance dated May 30, 2017, for U.S. Appl. No. 14/276,659, of Wilson, J., et al., filed May 13, 2014.
Notice of Allowance dated Jun. 30, 2017 for U.S. Appl. No. 14/284,227, of Wilson, J., et al., filed May 21, 2014.
Non-Final Office Action dated Aug. 24, 2017, for U.S. Appl. No. 14/481,760, of McCauley, N.P., et al., filed Sep. 9, 2014.
Final Office Action dated Oct. 6, 2017, for U.S. Appl. No. 14/444,741, of Seemann, D., et al., filed Jul. 28, 2014.
Non-Final Office Action dated Mar. 9, 2018, for U.S. Appl. No. 14/754,223, of Grassadonia, B., et al., filed Jun. 29, 2015.
Final Office Action dated May 15, 2018, for U.S. Appl. No. 14/481,760, of McCauley, N.P., et al., filed Sep. 9, 2014.
International Search Report and Written Opinion for International Application No. PCT/US2015/058168, dated Apr. 12, 2016.
Church, K.W., "A stochastic parts program and noun phrase parser for unrestricted text," Proceedings of the second conference on Applied natural language processing, pp. 136-143 (Feb. 9, 1988).
Non-Final Office Action dated Aug. 10, 2018, for U.S. Appl. No. 14/444,741, of Seemann, D., et al., filed Jul. 28, 2014.
Advisory Action dated Aug. 27, 2018 for U.S. Appl. No. 14/481,760, of McCauley, N.P., et al., filed Sep. 9, 2014.
Final Office Action dated Oct. 19, 2018, for U.S. Appl. No. 14/754,223, of Grassadonia, B., et al., filed Jun. 29, 2015.
European Patent Office; "EPO Summary of Arguments", Minutes of the Oral Proceedings before the Examining Division; Sep. 22, 2015; Munich, DE.
Non-Final Office Action dated May 2, 2019, for U.S. Appl. No. 14/481,760, of McCauley, N.P., et al., filed Sep. 9, 2014.
Final Office Action dated Jul. 8, 2019, for U.S. Appl. No. 14/444,741, of Seemann, D., et al., filed Jul. 28, 2014.

* cited by examiner

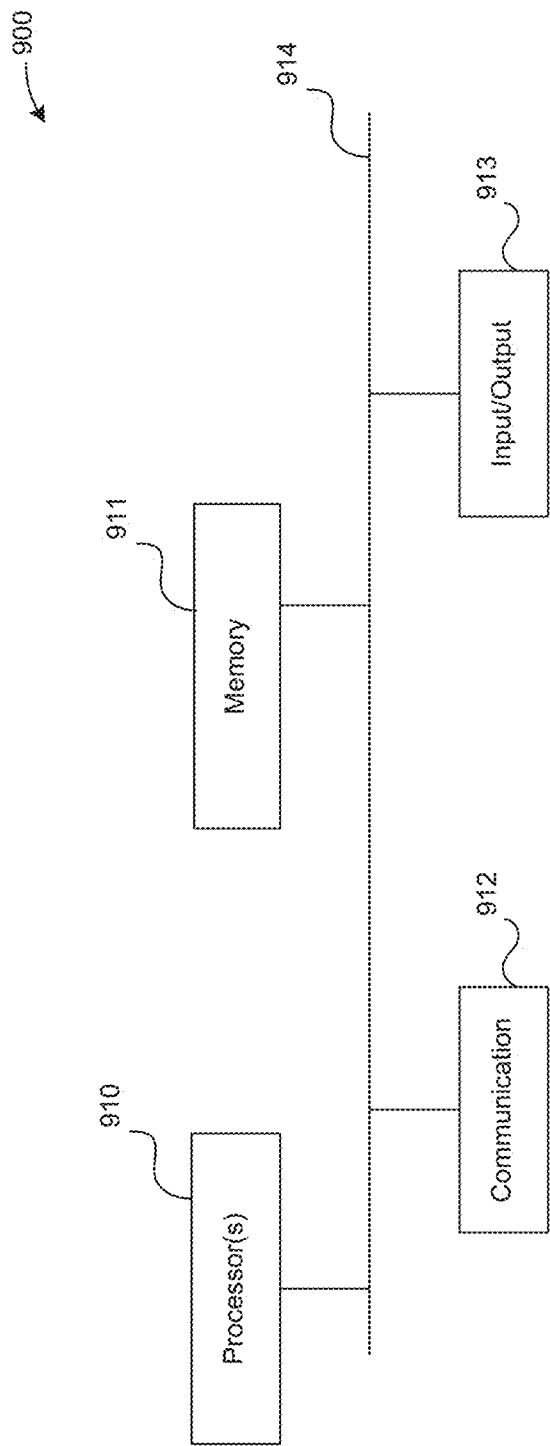

PROXIMITY-BASED PAYMENTS

BACKGROUND

Financial transactions are a crucial part of our everyday lives. On one end, there are financial transactions between merchants and customers. On the other end, there are financial transactions between customers. When two or more customers want to share the cost of a purchase, apportioning the cost between them can be difficult, especially when one or more of them want to pay by credit card. Consider, for example, the situation in which a social group gathers for a meal at a restaurant, where everyone is to pay for his or her own food and drink. When it comes the time to pay the check, the need of conducting payment from one party to another can create an inconvenient and sometimes awkward interruption in the social interaction of the group. When there is not enough cash in the social group to settle the bill, many customers also find annoying the need to remember and track down how much each party owes to another.

BRIEF DESCRIPTION OF THE DRAWINGS

One or more embodiments of the present invention are illustrated by way of example and not limitation in the figures of the accompanying drawings, in which like references indicate similar elements.

FIGS. 8A-8G illustrate examples of various screen displays that can be generated by a mobile payment application on a customer's mobile device to enable proximity-based payment.

FIG. 9 is a high-level block diagram showing an example of processing system in which at least some operations related to the generation of the disclosed quick legend receipt(s) can be implemented.

DETAILED DESCRIPTION

Figure 1:
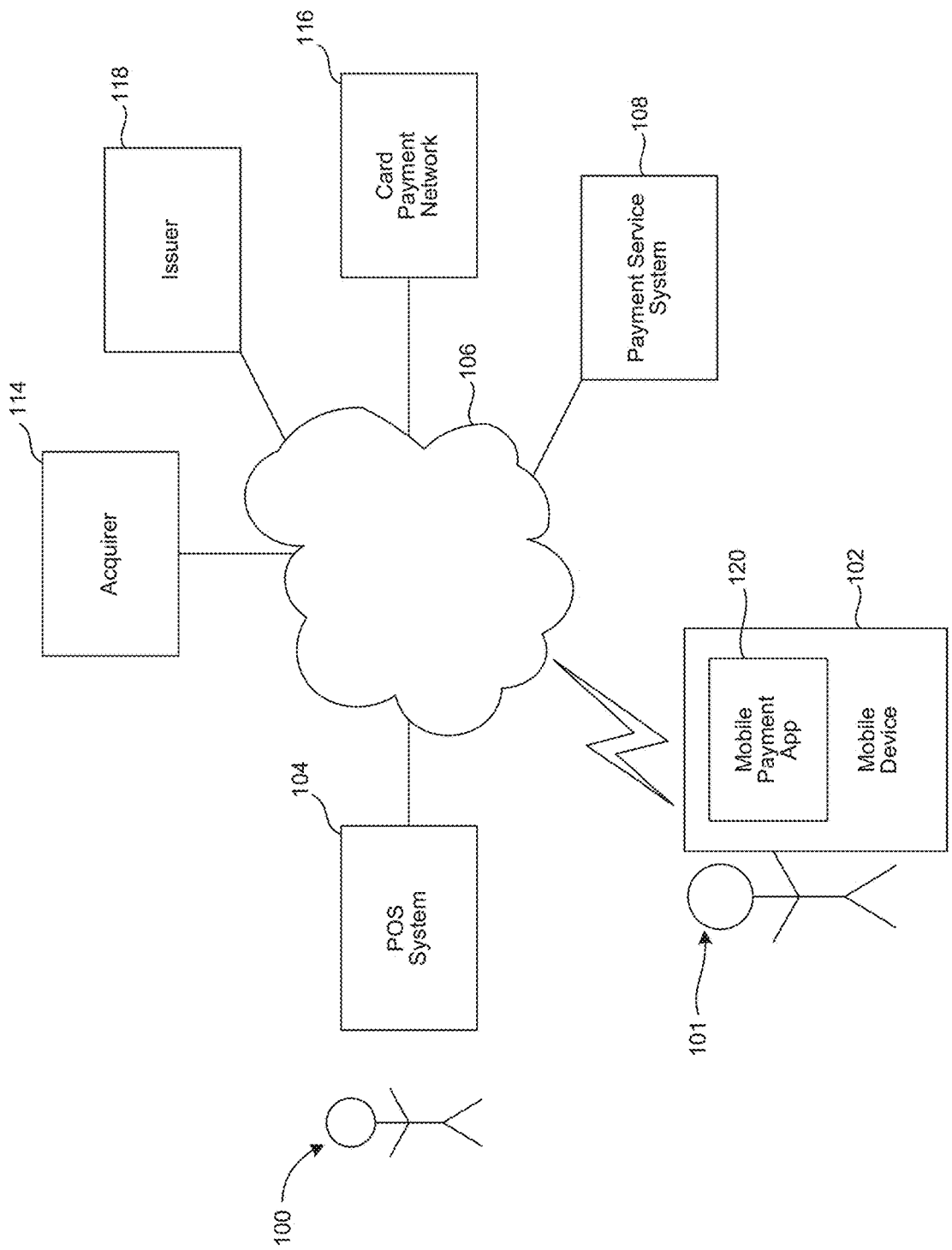
FIG. 1 illustrates an environment within which the proximity-based payment techniques introduced here can be implemented.

References in this description to "an embodiment," "one embodiment," or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

It is observed that the aforementioned need of conducting payment from one party to another often arises in social gatherings and can create annoyance. There are traditional ways of handling this kind of situation. For example, in one common approach, one member of the group uses a credit card, and the other members of the group reimburse that person with cash for their portions. With this approach, it is inconvenient and often time-consuming to have to calculate how much each person (or each couple or family) owes and then collect cash from the other members of the group. Additionally, it is common that some members of the group end up paying more or less than their fair share. In another common approach, the group asks the waiter to split the check in a certain manner, and everyone then either pays cash or uses his or her own credit card. This approach can also be troublesome if the check is not being split equally, and regardless, it is inconvenient and time-consuming for the waiter. In any of these situations, the need to deal with these issues detracts from the social atmosphere of the event.

To service non-sophisticated consumers, payment from one party to another should remain simple and easy to execute. Introduced here are techniques that facilitate customers' mobile devices to conduct proximity-based payments, which can further reduce the friction of conducting payments from one party to another. In the social dinning example discussed above, the techniques introduced here enable a customer (or a consumer, as used interchangeably herein) to pay another customer easily by using the customer's mobile device (e.g., a smartphone or tablet computer).

In short, the techniques involve communication among a mobile payment application installed on the customer's mobile device and a remote payment service system (PSS) (more of which is discussed below). The mobile payment application running on the customer's mobile device detects physical proximity of other customers' mobile devices, and enables the user to specify to whom and how much payment should be made. The mobile payment application communicates this information to the PSS, which then executes or triggers execution of the transfer of funds to carry out the specified payment. In some embodiments, the communication to the PSS enables the PSS to look up additional contact information; then, in certain examples, the PSS can transmit the additional contact information to the mobile payment application so that the payment transfers can be more easily facilitated (e.g., by automatically entering, for the user, those additional information of those customers who are physically nearby the user).

As described further below, mobile devices implementing the techniques disclosed herein can detect another device (or devices) that is close by and conduct payments. In certain embodiments, the techniques introduced here can utilize wireless personal area network (WPAN) circuitry (e.g., Bluetooth, Bluetooth Low Energy (BLE), Infrared Data Association (IrDA), etc.) that is equipped on a mobile device to determine whether there is another mobile device that is within the network and, in some examples, how close the another mobile device is. Preferably using his or her mobile devices, a customer user who wishes to enjoy the proximity-based payment functionality sets up the functionality by entering information about the customer's financial account (e.g., debit card information). For example, the customer enters the financial information in the customer's mobile device, and the customer's mobile device uploads to the PSS the financial account information together with an identifier that uniquely identifies the mobile device (such as an International Mobile Station Equipment Identity (IMEI) code or a BLE identifier (BLE ID)) so that the customer's mobile device is associated with the financial account.

When there is another mobile device detected in the network, the mobile device verifies whether the detected mobile device wishes to participate in proximity-based payments (i.e., allowing other mobile devices to conduct proximity-based payments with it). If the mobile device finds that the detected device also has proximity-based payment functionality enabled, then the mobile device prompts the customer to select the detected device for conducting a payment. For example, the mobile device can display icons or names that are representative of all the detected devices nearby that have their proximity-based payment functionalities enabled. As is described in fuller detail below, the devices nearby can have ways to control whether to be detected by the mobile device, and if so, in what manner they are to be displayed. The payment either can be sending from the customer's mobile device to the detected device, or can be receiving from the detected device to the customer's mobile device.

Upon the customer's selection of the detected device, the customer's mobile device can ask the customer to enter or to confirm an amount for the payment. Then, if the payment is from the customer's device to the detected device, the customer's device can cause the amount of payment to be transferred from the financial account associated with the customer's device to the financial account associated with the detected device. In variations, this process can also be initiated when the customer's device receives a request (or invitation) for payment from the detected device. On the other hand, if the payment is from the detected device to the customer's device, the customer's device can send out a request or invitation for payment to the detected device.

The techniques introduced here enable one customer to pay another quickly and easily compared to traditional methods. Furthermore, without the prerequisites of a customer having any information (e.g., an email address or a phone number) about another, the introduced techniques enable users to conduct payments with each other as long as they are in physical proximity, thereby greatly reducing the potential for awkward interruptions to the social flow of group events due to bill splitting issues, even in group events that include multiple distinct social circles. The introduced techniques are also advantageous over several traditional means of providing direct payment between two parties, such as an Automated Clearing House (ACH) network. In particular, the ACH is an electronic network for financial transactions in the United States and enables credit transfers including direct deposit, but the ACH would require a trial deposit of a trivial amount (e.g., $1) to verify the financial account, the process of which may take days. Indeed, traditional ways of direct monetary transfer from one bank account to another often involve time-consuming verification processes, which may reduce or even defeat the convenience that the techniques introduced here aim to bring.

In the following description, the example of a social dinning event is used, for illustrative purposes only, to explain various aspects of the techniques. Note, however, that the techniques introduced here are not limited in applicability to dinning in restaurants or to any other particular kind of scenario. Additionally, although the following description adopts debit cards as an example for the financial account information, the techniques introduced here are not limited to use with debit cards or other types of payment cards; rather, the techniques can be employed with essentially any suitable financial account that traditionally would be involved in monetary transfers. Additionally, the term "sale," as in point-of-sale (POS), refers to any type of payment-oriented transaction, including providing of a service, a lease or rental for example, and is not limited to an actual purchase. Note also that in this description, the term "user" generally refers to a consumer or a customer (as opposed to a merchant), except where otherwise indicated, and except that the term "user interface" does not necessarily refer to an interface used by a customer, as will be apparent from the context.

Additionally, while the customer generally uses a mobile device to conduct proximity-based payments in the embodiments emphasized herein, in other embodiments the consumer may use a processing device other than a mobile device to specify that information, such as a conventional personal computer (PC). In such embodiments, the mobile payment application can be replaced by a more conventional software application in such processing device, where such software application has functionality similar to that of the mobile payment application as described herein.

FIG. 1 illustrates an environment within which the proximity-based payment techniques introduced here can be implemented. The environment includes a mobile device 102 of a user 101 (also referred to as "customer" or "consumer"). Optionally, the environment can further include a merchant POS system of a merchant 100. The mobile device 102 can be, for example, a smart phone, tablet computer, notebook computer, or any other form of mobile processing device. In some implementations, a mobile payment application 120 can run on the user's mobile device 102 to interact with other components in the environment; for example, in one embodiment, the mobile payment application 120 can receive a digital version of a transaction receipt from the merchant. The environment also includes a computer system 114 of the merchant's acquirer, a computer system 118 of an issuing bank, a computer system 116 of a card payment network, and a computer system 108 of a payment service (hereinafter "payment service system (PSS) 108"). Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 106, which can be or include the Internet and one or more wireless networks (e.g., a wireless local area network (WLAN) and/or a cellular telecommunications network).

In a traditional credit card transaction, the merchant swipes the user's credit card through a card reader at the merchant's POS system 104. The POS system 104 sends data read from the card (e.g., the cardholders name, credit card number, expiration date and card verification value (CVV)) to the computer system 114 of the merchant's acquirer (hereinafter "acquirer 114"). The acquirer 114 sends this data to the computer system 116 of the card payment network (e.g., Visa or MasterCard) (hereinafter "card payment network 116"), which forwards the data to the computer system 118 of the issuing bank (hereinafter "issuer 118"). If the transaction is approved by the issuer 118, a payment authorization message is sent from the issuer 118 to the merchant POS system 104 via a path opposite of that described above.

Figure 2:
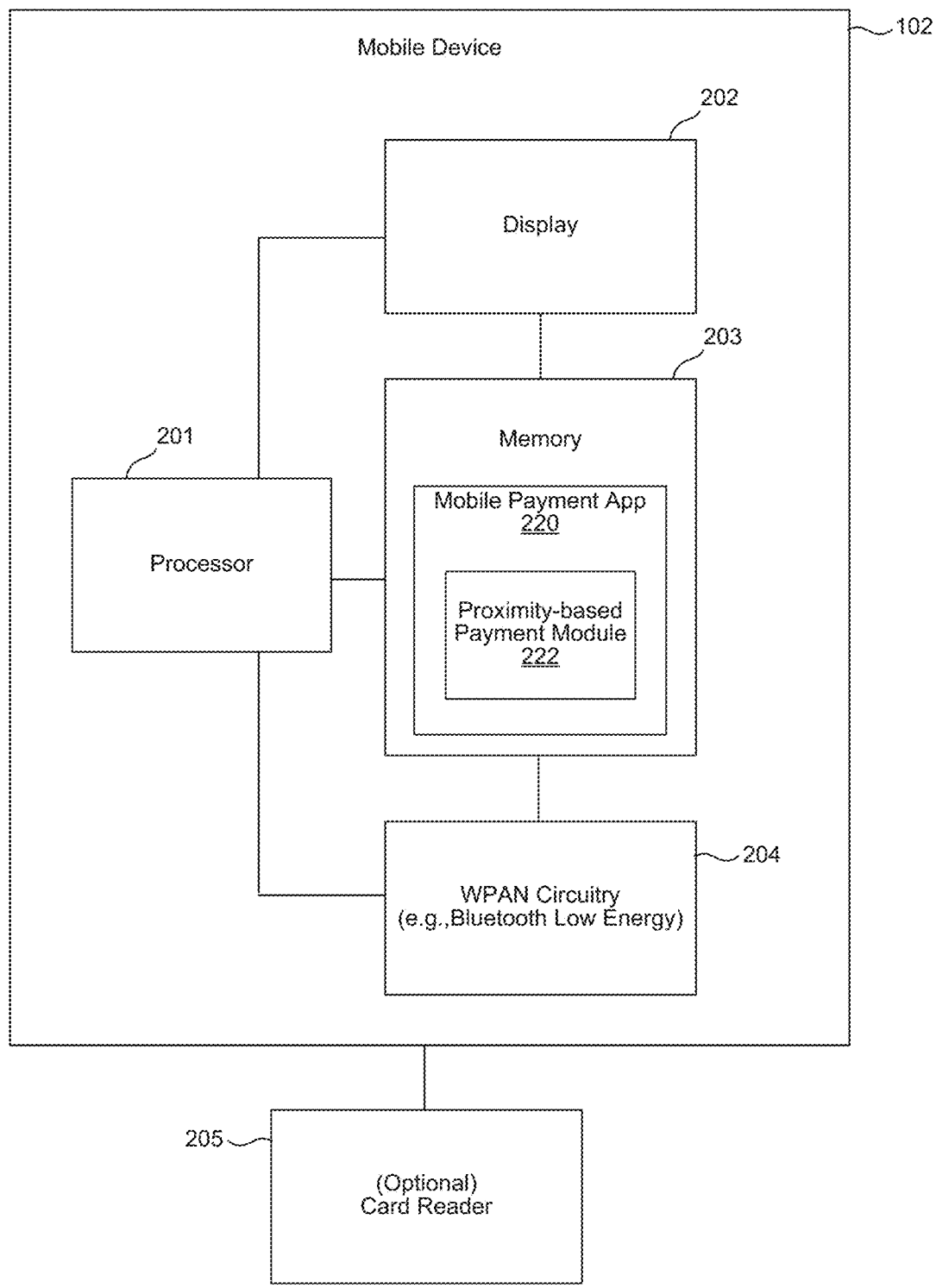
FIG. 2 illustrates an example of a mobile device implementing one or more techniques disclosed herein.

FIG. 2 illustrates an embodiment of the user's mobile device 102 implementing one or more techniques disclosed herein. Note that the components shown in FIG. 2 are merely illustrative; certain components that are well known are not shown for simplicity. Referring to FIG. 2, the mobile device 102 includes a processor 201, a memory 203 and a display 202. The mobile device 102 also includes a wireless personal area network (WPAN) circuit 204, and optionally, a card reader 205. The processor 201 can have generic characteristics similar to general purpose processors or may be application specific integrated circuitry that provides arithmetic and control functions to the mobile device 102. The processor 201 can include a dedicated cache memory (not shown for simplicity). The processor 201 is coupled to all modules 202-205 of the mobile device 102, either directly or indirectly, for data communication.

The memory 203 may include any suitable type of storage device including, for example, an SRAM, a DRAM, an EEPROM, a flash memory, latches, and/or registers. In addition to storing instructions which can be executed by the processor 201, the memory 203 can also store data generated from the processor module 201. Note that the memory 203 is merely an abstract representation of a generic storage environment. According to some embodiments, the memory 206 may be comprised of one or more actual memory chips or modules. The display 202 can be, for example, a touch-screen display, or a traditional non-touch display (in which case the mobile device 102 likely also includes a separate keyboard or other input devices). Optionally, the mobile device 102 can include or be coupled to a card reader 205, which can be any suitable physical card reader that can read a physical card, such as a magnetic stripe card reader, an optical scanner, a smartcard reader, a radio frequency identification (RFID) reader, or the like.

The WPAN circuitry 204 is wireless communication circuitry that can form and/or communicate with a computer network for data transmission among electronic devices such as computers, telephones, and personal digital assistants. WPANs can be used for communication among the personal devices themselves or for connecting to a higher level network (e.g., a WLAN) and the Internet. Some examples of the WPAN circuitry 204 include IrDA, Bluetooth (including aforementioned BLE), Z-Wave, ZigBee, Body Area Network, and so forth. In some embodiments, the WPAN circuitry 204's connection can be bootstrapped by a near field communication (NFC) connection.

A mobile payment application 220 may be or include a software application, as henceforth assumed herein to facilitate description. As such, the mobile payment application 220 is shown as being located within the memory 203. Alternatively, the mobile payment application 220 could be a hardware or a firmware component (which may include a mobile payment software application).

In accordance with some embodiments of the techniques introduced here, the mobile payment application 220 includes a proximity-based payment module 222 that implements the techniques introduced here and provides proximity-based payment functionalities to the mobile device 102. The proximity-based payment (PBP) module 222 communicates with the mobile payment application 220. The PBP module 222 may also communicate with the display 202, either directly or through the mobile payment application 220. Similar to the mobile payment application 220, the PBP module 222 can be software, hardware, or a combination thereof. As illustrated in FIG. 2, the PBP module 222 can be an integral part of the mobile payment application 220. Alternatively, although not shown in FIG. 2 for simplicity, the PBP module 222 can be logically separate from the mobile payment application 220 but operate "alongside" it (such as the case of having two separate mobile software applications installed on the mobile device 102). Further details on how various embodiments of the proximity-based payment module 222 operate in implementing the proximity-based payment techniques disclosed here are discussed below.

In some embodiments, the mobile application 220 can employ a number of techniques for simplifying customer-to-customer transactions by use of an email mechanism. Some examples of these techniques are discussed in U.S. patent application Ser. No. 14/246,017, entitled "PAYMENT TRANSFER BY SENDING EMAIL," filed Apr. 4, 2014, which is assigned to the same assignee as the present application. In general, these techniques enable a simplified payment transaction system for ordinary consumers without the hassle of having to sign up, to remember a user account associated with a password, and to login for sending or receiving every payment transaction, while not sacrificing the essential security feature of authenticating the user for every payment transaction. To send a payment, the user needs to only specify a receiver email address in an email. When the payment email is created, the email can be auto-populated with a security token. The email can also carbon copy (Cc), blind carbon copy (Bcc), or add as a recipient (To) a payment processing email address. When the email is sent, the payment processing system 108 can receive the payment email (e.g., by receiving the payment email through the payment processing email address) and generate a payment receipt interface for the receiver of the email.

Although these embodiments of the mobile application 220 can provide easy execution of customer-to-customer financial transactions (e.g., payment transfers), it is observed here that the above-described process can be even further simplified if the requirement for identifying the email addresses of the receivers (or payers, whichever the situation may be) can be removed. Accordingly, by one or more techniques discussed here, the proximity-based payment module 222 provides the mobile payment application 220 the ability to identify another customer that is nearby, and the ability to automatically enter contact information (e.g., email) of the identified, nearby customer for payment transaction, such that interruption caused by payment transfers to the flow of a social event (e.g., asking another customer for his or her email address) can be further reduced. More implementation details of the proximity-based payment module 222 is discussed blow.

Figure 3:
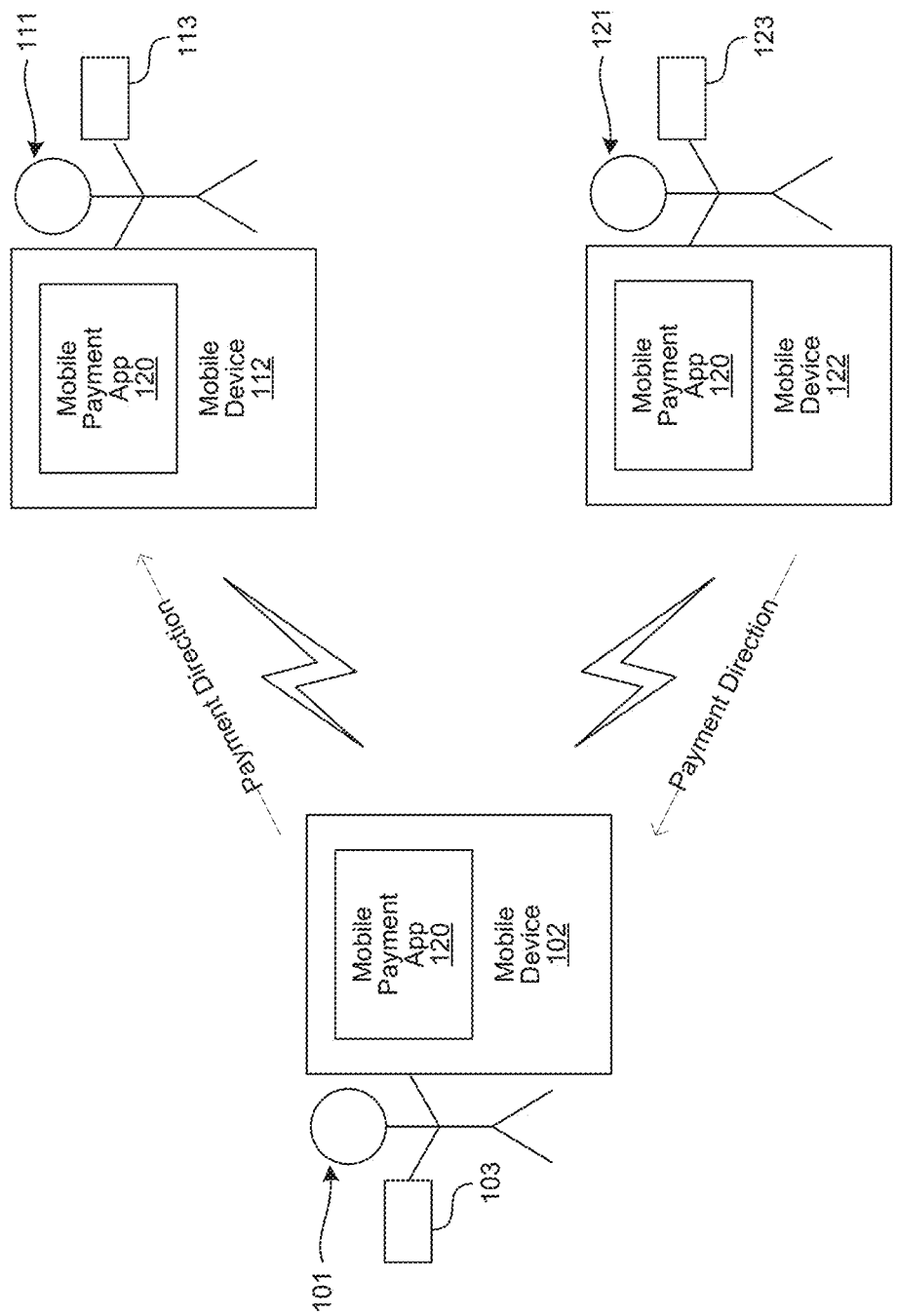
FIG. 3 illustrates an example of proximity-based payments being conducted by a customer's mobile device with other customers' mobile devices.
Figure 4:
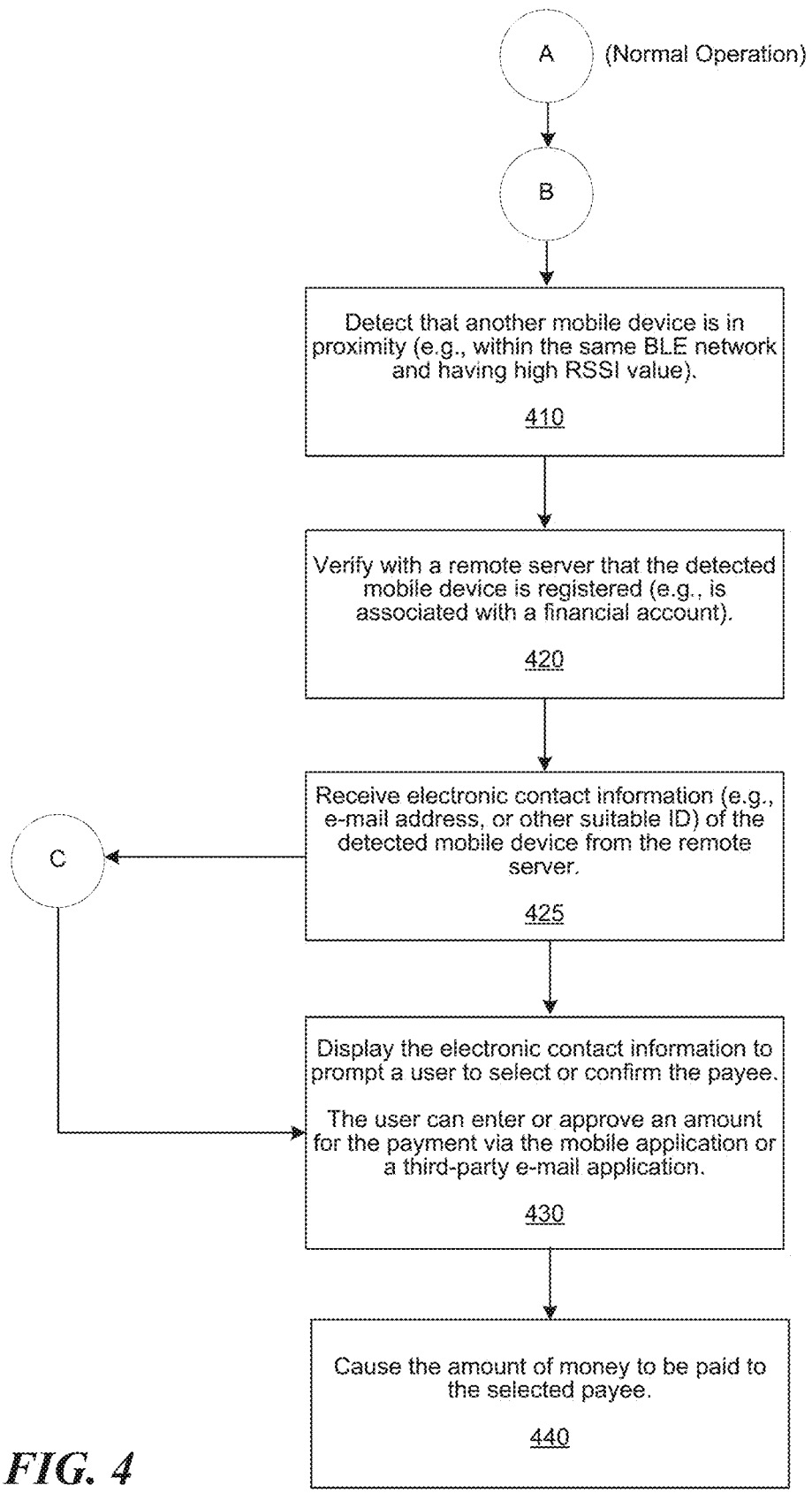
FIG. 4 is a flow diagram illustrating an example of a process for conducting proximity-based payments between mobile devices.
Figure 5:
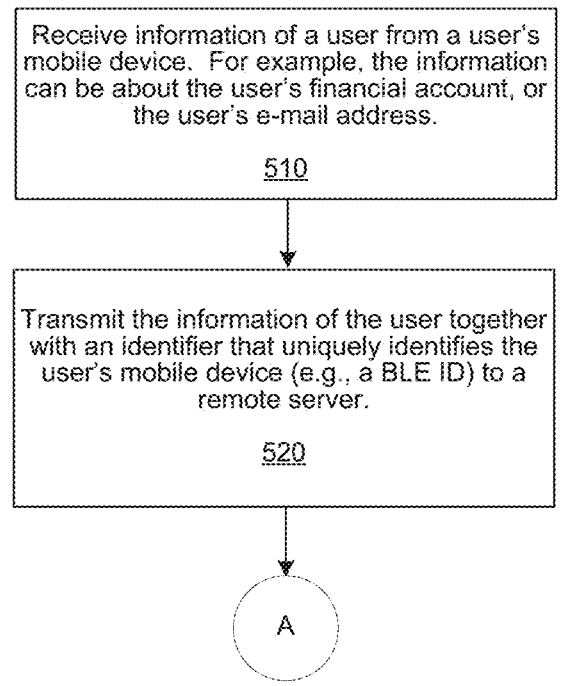
FIGS. 5-6 are two flow diagrams illustrating optional features which can be implemented with the example process of FIG. 4, in accordance with some examples.
Figure 6:
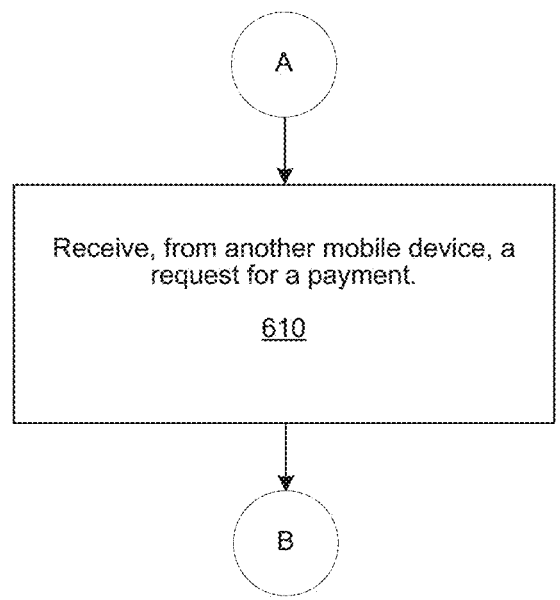
Figure 7:
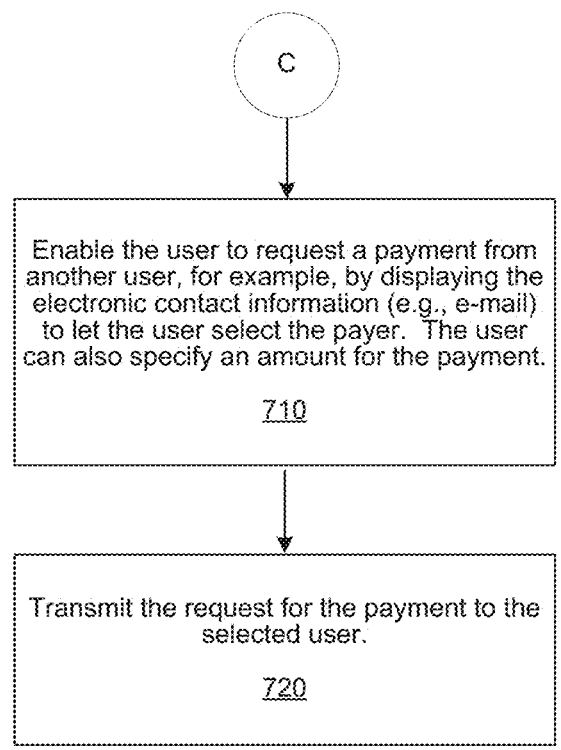
FIG. 7 is a flow diagram illustrating an example of an additional or alternative process for conducting proximity-based payments between mobile devices.

FIG. 3 illustrates an example of proximity-based payments being conducted by a customer's mobile device 102 with other customers' mobile devices 112 and 122. FIGS. 4-7 are flow diagrams illustrating various examples of a process (e.g., to be executed by the mobile payment application 120) for conducting proximity-based payments among mobile devices 102, 112, and 122. FIGS. 8A-8G illustrate examples of various screen displays that can be generated by a mobile payment application on a customer's mobile device to enable proximity-based payment. For purposes of illustration, the process of FIGS. 4-7 is explained with reference to certain elements illustrated in FIG. 3.

As illustrated in FIG. 3 and continuing with the above social dinning example, users 111 and 121 are in proximity with the user 101 after the dinning and would like to settle the bill. For example, the user 101 needs to make payment to user 111 and also needs to receive payment from user 121.

In preferred embodiments, before the user 101 can pay the user 111, the user 101 enables the proximity-based payment functionality in the mobile payment application 120 by entering information about a financial account of the user 101. For example, the user 101 enters information about his or her debit card 103 (e.g., through the card reader 205 or other input devices present on the mobile device 102) into the mobile payment application 120. After the mobile payment application 120 receives (510) the information about the financial account, the application 120 transmits (520) the information entered by the user 101 together with an identifier that uniquely identifies the mobile device 102 to a remote server (e.g., the PSS 108) so that the mobile device 102 is associated with the user 101's financial account (as indicated by the card 103). For example, the identifier can be the IMEI code of the mobile device 102. In one embodiment, the identifier is a BLE ID, a unique ID identifying each and every BLE chip. The transmission from the application 120 to the PSS 108 can be encrypted.

Note that, although a debit card is used for purposes of explaining the present techniques, the card 103 is not limited to an actual card of such kind; in alternative examples, the card 103 can represent an online bank account or any suitable payment account that can be used by the user 101 to transfer and/or receive currency. Further, in some embodiments, one mobile device can be associated with more than one financial accounts; in these embodiments, the mobile payment application 120 can adapt well-known multi-account managing techniques that allow the user 101 to identify which financial account should be used for conducting proximity-based payments. As an alternative, the user 101 can enter his or her financial account information along with the identifier that uniquely identifies the device 102 directly onto the PSS 108 (e.g., via a webpage that the PSS 108 hosts). In this alternative case, the PSS 108 can separately verify the correctness of the received information (e.g., by sending a text message to the mobile device 102). In other embodiments, the user 101 can associate the mobile device 102 and/or his particular instance of the mobile application 120 by registering (e.g., his email address) with the PSS 108.

Additionally or alternatively, the user 101 can enter other contact or identification information into the mobile payment application 120. Similar to the aforementioned financial account information, these contact or suitable identification information of the user 101 can be communicated to the PSS 108 so that these information can be associated to the mobile device 102. For example, in certain implementations where the mobile payment application 120 can initiate or cause proximity-based payment transaction by use of emails, the user 101 should enter his or her email address so that the PSS 108 can have the email address as one of the mechanisms available for identifying the mobile device 102. Note that, in some examples that can cause payment transfers using email, the financial account information (e.g., the debit card information) need not be entered into the PSS 108—the email address can be used for payment transfers instead.

Similar to how the user 101 enables the proximity-based payment functionality by associating the mobile device 102 with the debit card 103, the users 111 and 121 each enable the proximity-based payment functionality on their mobile payment applications 120 by respectively associating the mobile device 112 with the debit card 113, and the mobile device 122 with the debit card 123. For certain implementations where the mobile payment application 120 can initiate proximity-based payment transaction by utilizing emails, the users 111 and 121 each should enter their email addresses into their respective mobile payment applications 120.

During normal operation, the mobile device 102 can conduct proximity-based payments with the mobile device 112 by first detecting (410) that the mobile device 112 is within the wireless network, such as within range of a BLE network. The detection can be initiated, in one example, when the user 101 selects to activate the mobile application 120 on the device 102, or in another example, when the user 101 selects to switch the mobile application 120 to run in foreground. More specifically, the mobile device 112 can sense the BLE devices (e.g., the device 112) that are nearby using BLE proximity sensing, e.g., estimating physical proximity using the radio receiver's received signal strength indication (RSSI) value. In other examples, the mobile application 120 may invoke other types of short-range wireless communication feature of the mobile device 102, such as infrared communication, WiFi, or the like.

To balance security, privacy, and convenience, a mobile device can choose (e.g., by turning off a particular WPAN circuit, by closing the mobile software application 120, or by refusing to be connected for proximity-based payment) whether it can be detected by other mobile devices within the network.

Depending on the implementation, some embodiments of the mobile payment application 120 only allows a mobile device to be discoverable when an instance of the mobile payment application 120 is running; for example, some embodiments of the application 120 allow proximity-based payment only when they are operating in the foreground, and some other embodiments of the application 120 allow proximity-based payment regardless of whether they are operating in the foreground or the background. Additionally or alternatively, the mobile payment application 120 can require a password before another mobile device attempts to detect or connect for proximity-based payment purposes. The password that authenticates a first mobile device (e.g., device 102) to conduct proximity-based payments with a second mobile device (e.g., device 112) is designated by a user of the second mobile device. The password protection is preferred in some implementations of the mobile payment application 120 which can remain in the background and broadcast about its capability to conduct proximity-based payment.

In some embodiments, a user can select to accept or refuse to conduct proximity-based payment with some particular mobile devices but not others. In these embodiments, the mobile payment application 120 of the mobile device 102, for example, can send out a query to the mobile payment application 120 of the mobile device 112, and the mobile device 112 can send out a signal (e.g., in response to the query) indicating whether the mobile device 112 allows conducting payments with the mobile device 102. In one example, the mobile device 102 also measures a received signal strength of a beacon signal sent from the mobile device 112, and the mobile device 112 is only considered detected when the received signal strength of the beacon signal sent from the mobile device 112 exceeds a predetermined threshold, i.e., when the mobile device 112 is close enough. In variations, the user can approve a nearby mobile device for a one-time-only proximity-based payment.

In addition or as an alternative to aforementioned ways of directly detecting proximity of other devices, the mobile payment application 120 of the mobile device 102 can indirectly detect the physical proximity of the mobile devices (e.g., device 112). In one example, even though the two devices (e.g., device 102 and 112) may not be within the same wireless network (e.g., a BLE network), the two devices can individually and separately determine their locations and transmit their locations back to the PSS 108, which can in turn determine that the two devices are in physical proximity for conducting proximity-based payments. How each device can determine its own physical location can be achieved through various means, for example, location calculation based on a global positioning satellite receiver, or triangulation from a number of nearby wireless base stations.

In this way, the mobile device 102 can identify, among the nearby devices within the wireless network, which devices are suitable candidates for conducting proximity-based payments by detecting, for example, which devices have their mobile payment application 120 up and running and with strong BLE signals. These features and options can also be adjusted depending on the user's preference in one or more embodiments.

Referring back to FIG. 3, after the mobile device 112 is detected by the mobile device 102, the mobile device 102 verifies (420) with the PSS 108 that the mobile device 112 is eligible for proximity-based payment; that is to say, the mobile device 102 verifies (420) with the PSS 108 that the user 111 has completed the aforementioned card association process and that the mobile device 112 is indeed associated with the card 113. Specifically, in at least those embodiments which employ BLE for conducting proximity-based payments, the mobile device 102 receives an identifier that uniquely identifies the mobile device 112 during the detection phase. As such, the mobile device 102 can verify with the PSS 108 by transmitting the identifier received from the mobile device 112 to the PSS 108 to ascertain the mobile device 112's eligibility for conducting proximity-based payments.

Figure 8A:
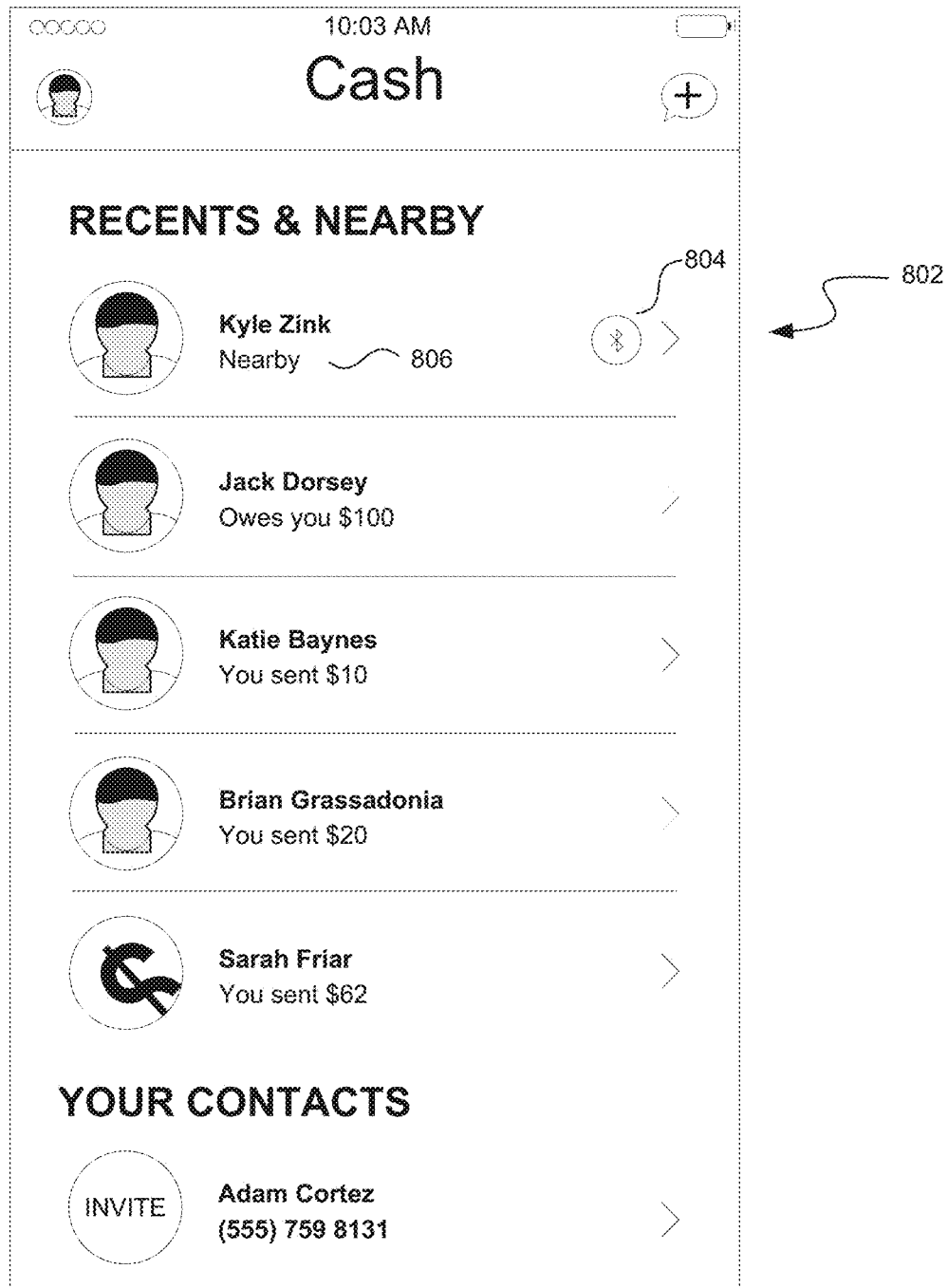
Figure 8B:
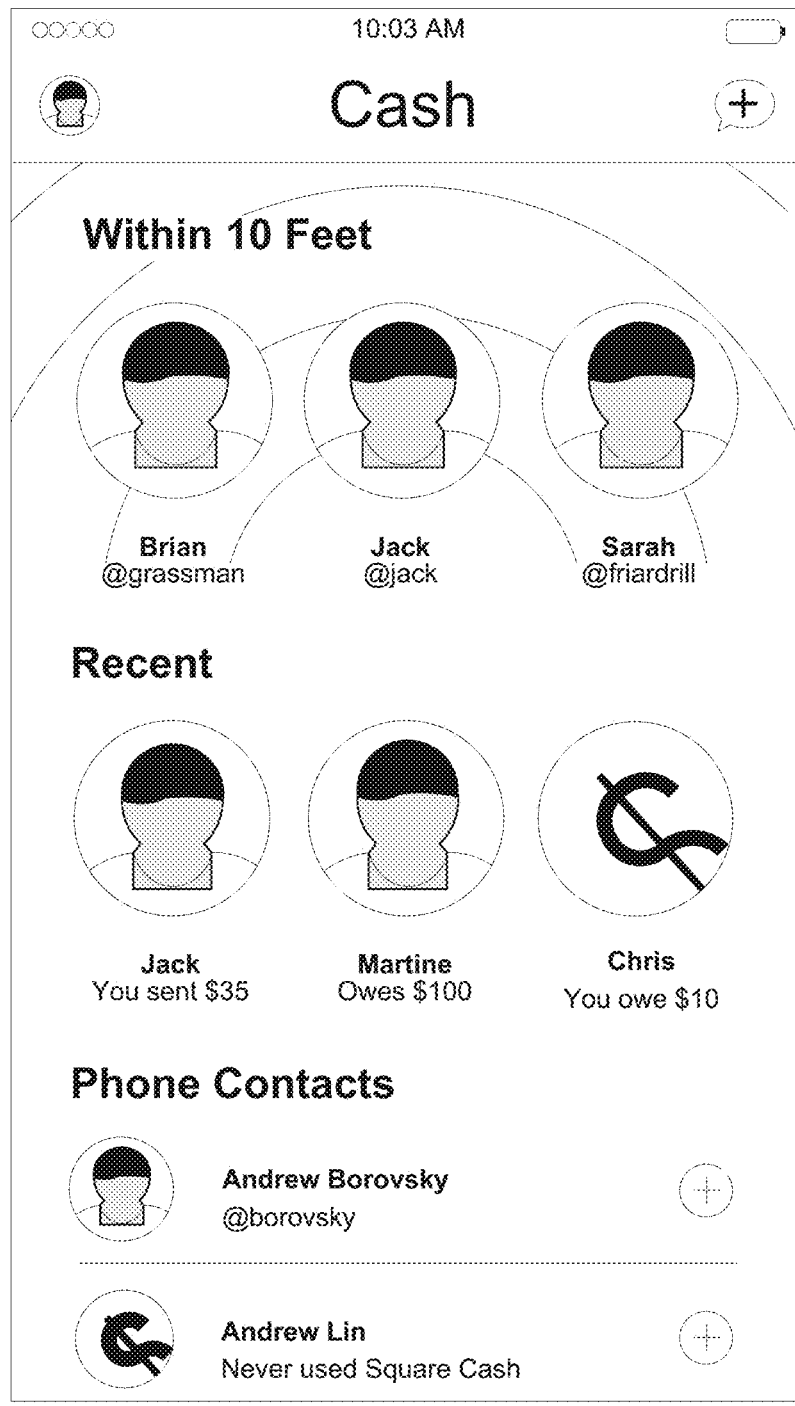
Figure 8C:
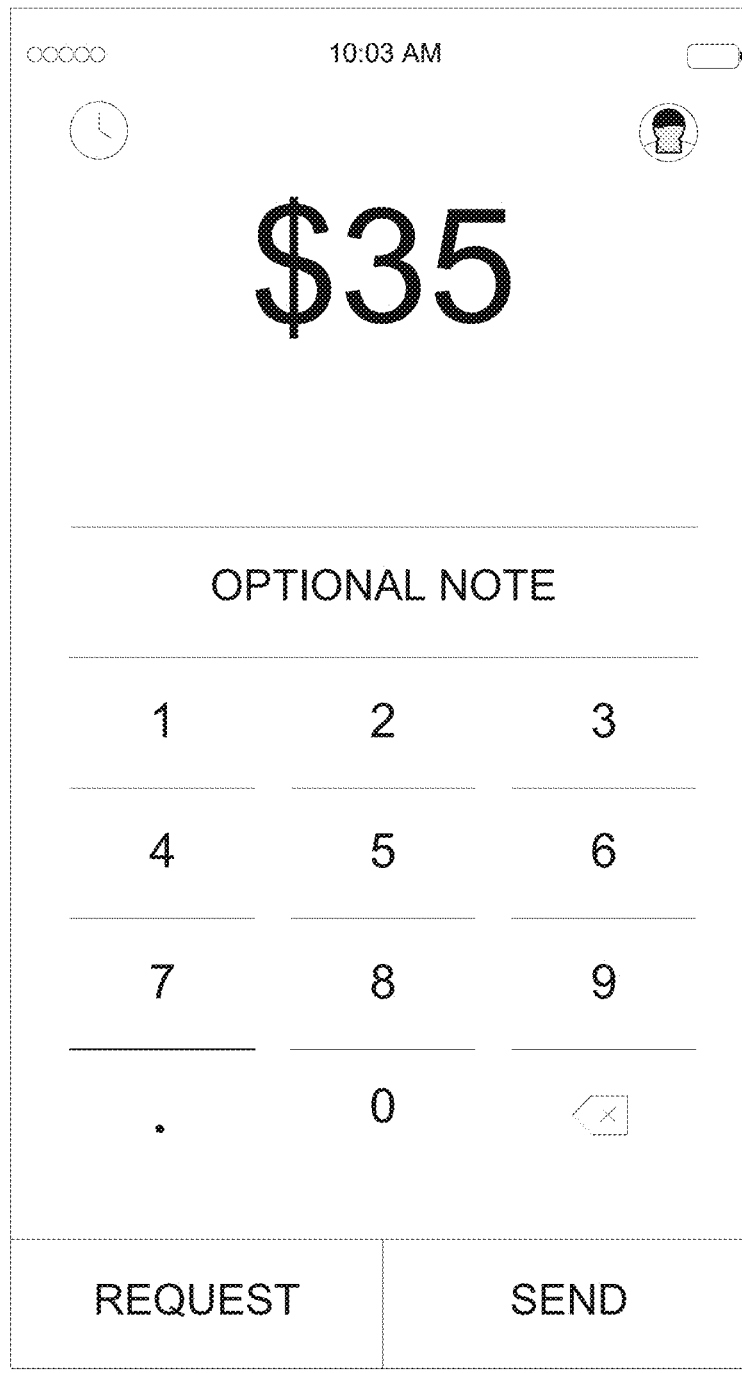
Figure 8D:
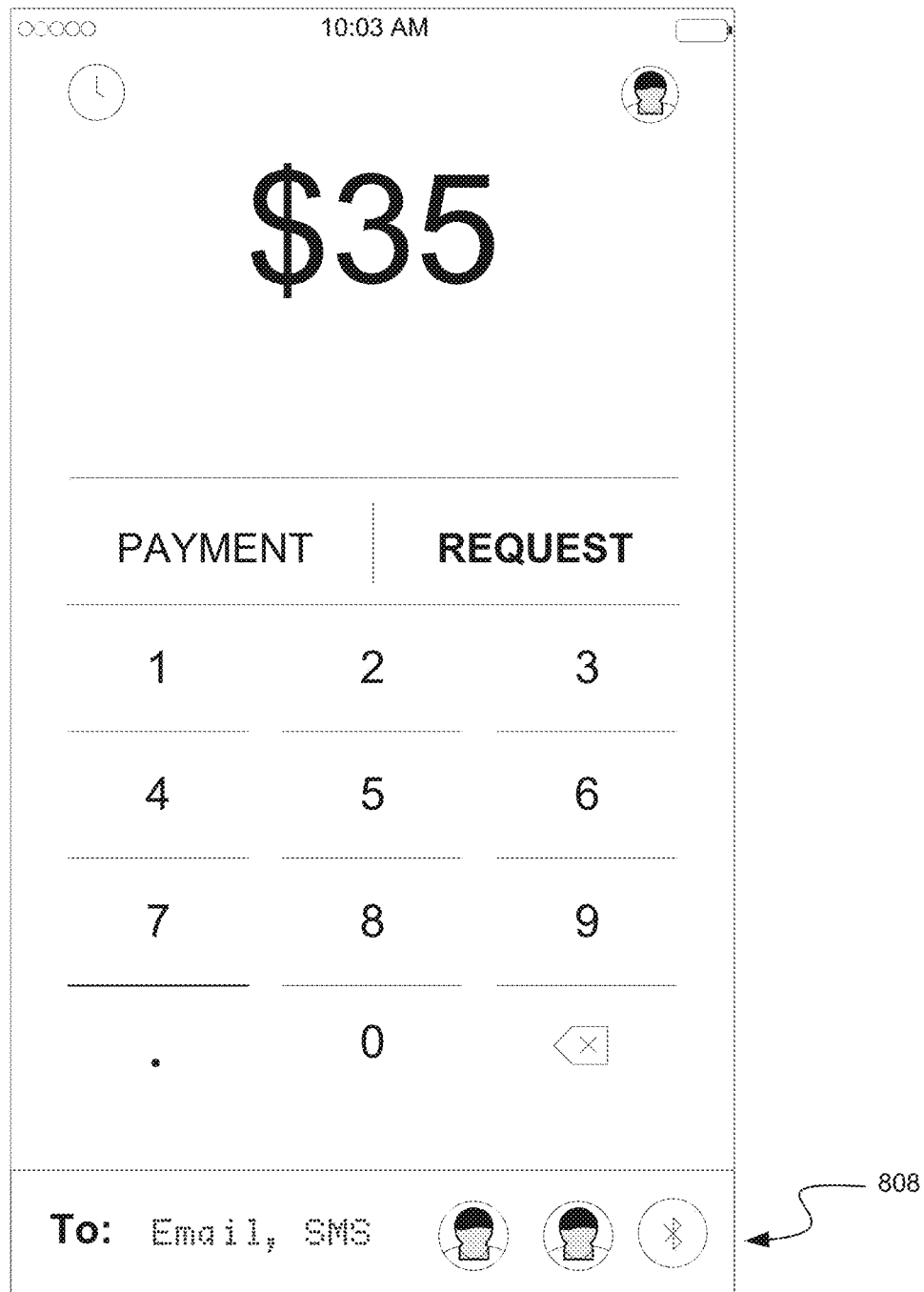
Figure 8E:
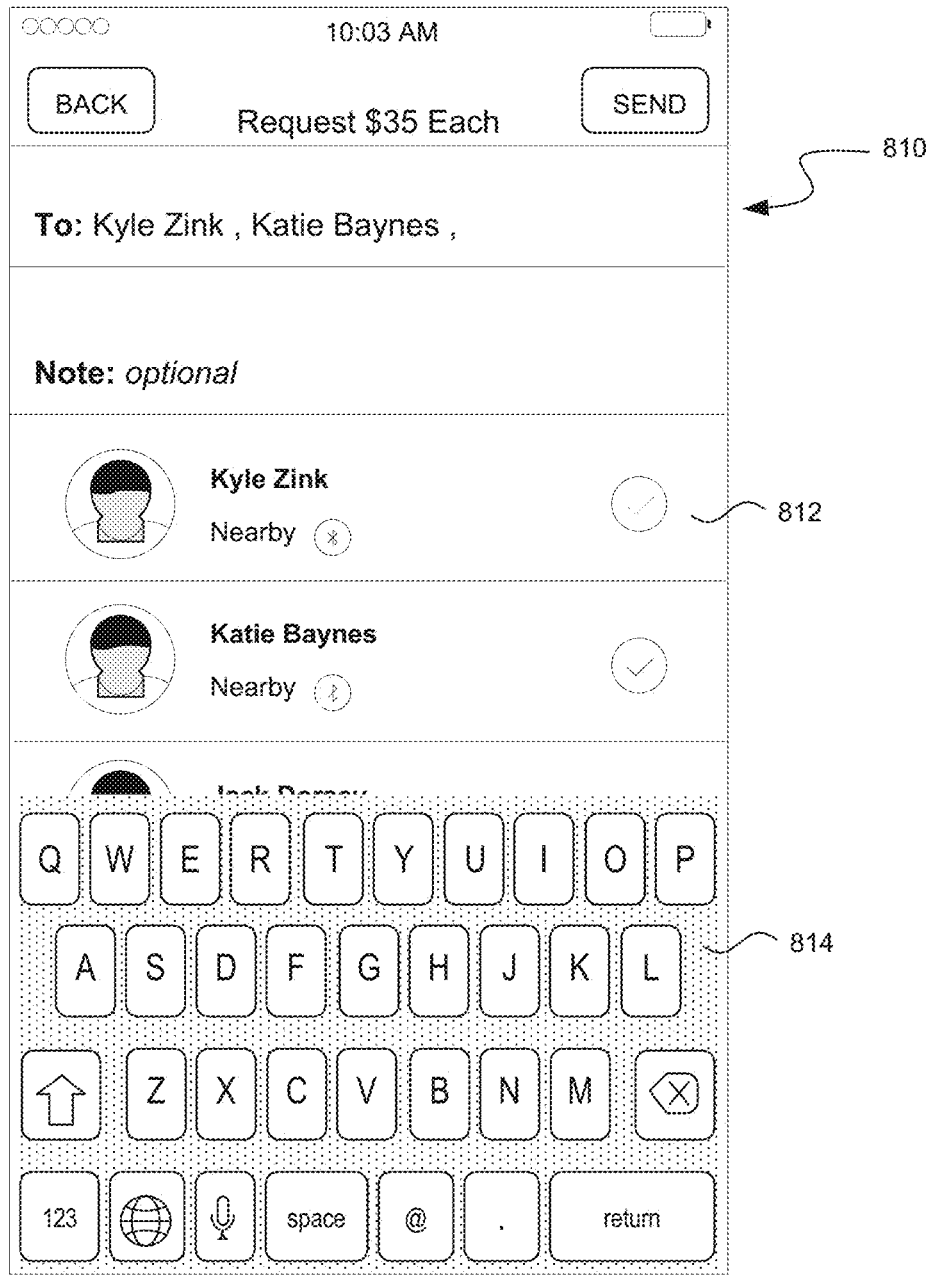
Figures 8F, 8G:
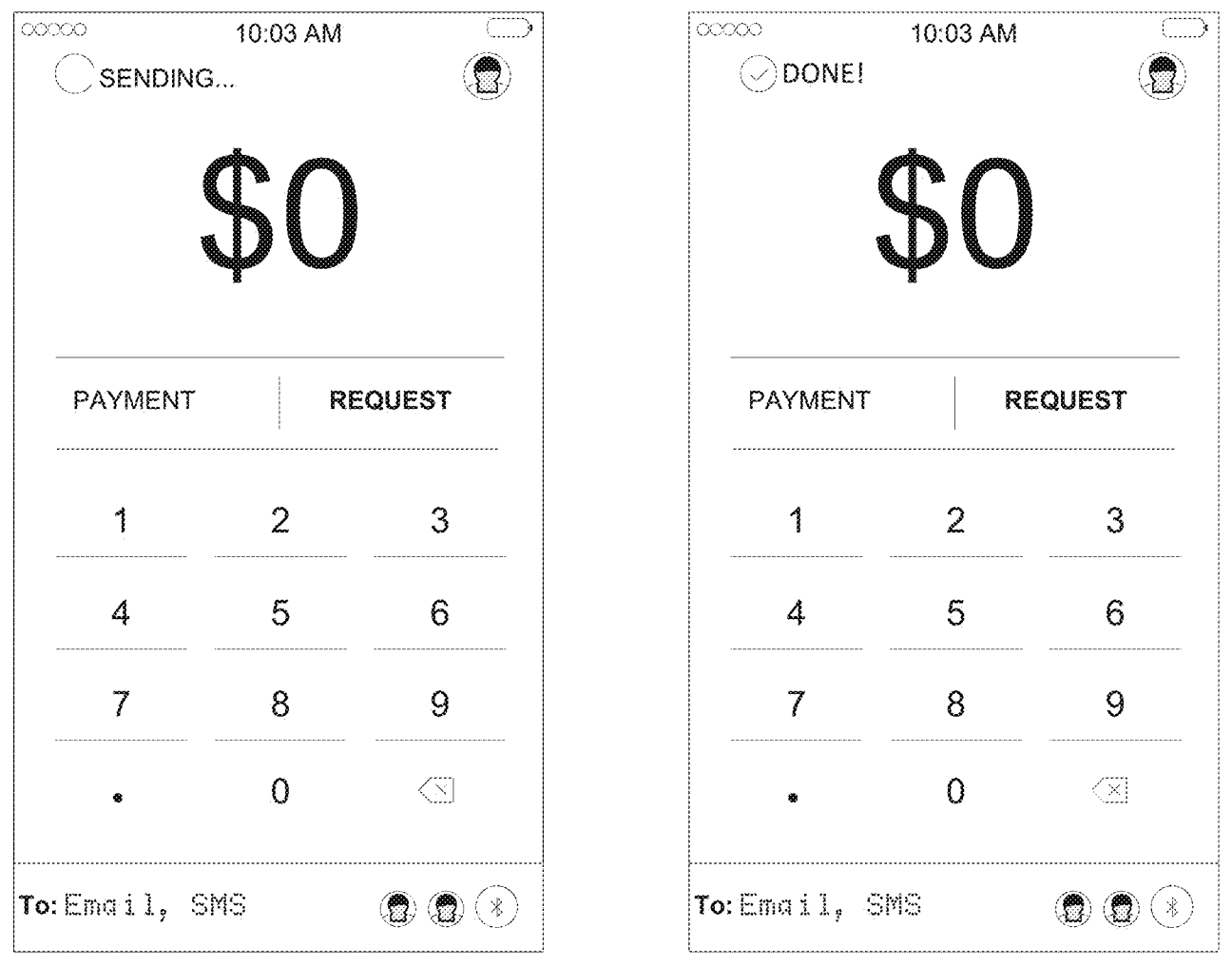

Depending on the embodiment, either after the mobile device 112 is detected or after the mobile device 112 is verified, the mobile device 102 can receive user information about the mobile device 112 (e.g., the user 111's name, nickname, portrait, email or contact information, etc.) from the PSS 108. The mobile device 102 can display the received user information on the display of the mobile device 102 for the user 101 to identify the user 111. In some examples, the mobile device 112 is displayed as an icon once detected, and the icon is replaced by the user information once the mobile device 112 is verified by and the user information received from the PSS 108. In various embodiments, the user of the detected device has control over what user information is to be displayed. After the user information is received, a screen such as FIG. 8A can be displayed by the mobile application 120 to the user 101. As shown in FIG. 8A, the displayed screen can show a list that includes the users (e.g., user 802) of those detected devices that are detected in proximity for the user 101 to select (e.g., for purposes of conducting proximity-based payments). These users can be further identified by an icon 804 and a description 806 to indicate that they are displayed for the reasons of being in proximity. Other users, such as the users who has recently conducted payments with the user 101, can also be displayed in the list. FIG. 8B shows an alternative implementation of the screen of FIG. 8A.

In some embodiments, either the mobile application 120 or the PSS 108 can identify, from those physically-proximate devices, a list of devices with users that are socially connected to the user 101. Then, the user 101 can configure the mobile application 120 so that it only provides information regarding identities of the users socially connected to the user 101. More specifically, in some embodiments, the mobile application 120 can detect people in the vicinity (e.g., for those people that have their "detectability" turned on) The proximately-located devices can either be discovered directly by the mobile device 102 using, for example, BLE, or can be discovered by the PSS 108 based on the PSS 108's understanding of devices located in proximate geographic regions. Either way, the PSS 108 or the mobile application 120 can recognize a list of people nearby, but only provides information relating to people known or otherwise socially connected with the user to be displayed as people in the proximate list. In some examples, a person can be regarded as "socially connected" because the user 101 has previously had a payment transfer or financial transaction with this person. In other examples, either the mobile application 120 or the PSS 108 can have access to the user 101's social network account (e.g., a Facebook™, a LinkedIn™, or other suitable social networking sites) and determines that this person is socially connected to (e.g., within a social circle of) the user 101.

Moreover, after aforesaid measurements of received signal strengths sent from all the detected mobile devices (e.g., devices 112 and 122) in proximity (e.g., within the BLE network), the mobile device 102 can sort all detected mobile devices based on their received signal strengths. As a variation, the mobile device 102 can also sort all detected mobile devices based on a frequency of past payments conducted between the mobile device 102 and each of the detected mobile devices. For example, the user 101 can set up, in the mobile device 102, a black list for those devices that are disallowed for proximity-based payment, a white list for those that are allowed, and/or a favorite list for those that are to be displayed on the top of the list (or as highlighted in a map) of all detected devices.

By displaying information indicative of the mobile device 112 to the user 101, the mobile device 102 prompts (430), via the display of the mobile device 102, the user 101 to select or confirm the mobile device 112 for a proximity-based payment. As discussed above, the payment can be from or to the mobile device 102, which can be chosen by the user 101. As illustrated in the example scenario of FIG. 3, because the payment is assumed to be made from the mobile device 102 to the mobile device 112, upon selection (e.g., by a click on the displayed screen of FIG. 8A or FIG. 8B) from the user 101 of the mobile device 112, the mobile device 112 prompts (430) the user 101 to enter or approve an amount for the payment to the user 111 of the mobile device 112, such as shown in an example display illustrated in FIG. 8C. In an additional or alternative embodiment, an example interface illustrated in FIG. 8D can be used to replace the interfaces illustrated in FIGS. 8A-8C. Note that the display of FIG. 8D includes an input area 808 (which is labeled as "To:" field) that can display the detected, nearby users. The interface of FIG. 8D also provides the amount input functionality of FIG. 8C. Depending on the application, the example display of FIG. 8D may be more beneficial than that of FIGS. 8A-8C because it reduces the number of interfaces that the user 101 has to go through to conduct the payment transfer, thereby increasing the convenience factor.

Note that, as is further discussed below, in the examples where the mobile device 102's proximity-based payment is initiated in response to a request from the mobile device 112, it may not be necessary for the user 101 to enter the amount for the payment; because the amount can be received from the mobile device 112, the user 101 may only need to approve (rather than enter) the amount for the payment. By the same token, it may not be necessary for the user 101 to select the mobile device 112; if the payment is initiated in response to the mobile device 112's request, then the user 101 may only need to confirm (rather than select) the mobile device 112 for the payment. For example, in the display illustrated in FIG. 8E, trusted contacts can be pre-filled in the To: field 810. In some embodiments, trusted contacts are also indicated by a predetermined icon 812. Optionally, a keyboard 814 can be displayed (e.g., upon the user 101 selecting the To: field 810) to enable search or edits.

After the payment information is confirmed by the user 101, the mobile device 102 causes the amount to be transferred from the financial account associated with the mobile device 102 to the financial account associated with the mobile device 112. More specifically, after the user 101 has input or confirmed the payment information to the mobile device 102, the mobile payment application 120 causes the mobile device 102 to transmit a message to convey that payment information to the PSS 108. The PSS 108 then executes or triggers a money transfer process to carry out the payment, according to the payment information received from the mobile device 102. In some examples, to cause the PSS 108 (for example) to carry out the payment, the mobile device 102 communicates with the PSS 108 the unique identifier of the payer (which in this case, mobile device 102), the unique identifier of the payee (which in this case, mobile device 112), and the amount to be transferred. The mobile application 120 can display a transmitting screen and a confirmation screen, such as respectively illustrated in FIGS. 8F and 8G, to the user 101 so as to keep the user 101 informed of the status of the payment transfer.

In some implementations, the mobile application 120 can transmit cause to the PSS 108 to conduct payment transfers between the user 101's financial account and another person's financial account that is identified by the user 101. For example, the mobile application 120 can communicate with the PSS 108 by sending an email, a text message, a multimedia message, or a message that uses a proprietary communication protocol between the mobile application 120 and the PSS 108.

In some examples, the email is generated by an email application separate from the money-transfer application (e.g., a native email application or a third-party email application, such as an Gmail™ application). The email can include an email address associated with the PSS 108. The email can further include, for example, in its body or header portion, an indication of the monetary amount to be transferred to or from the user 101's financial account. In some implementations, the email is generated with pre-populated information including (1) an email address associated with the PSS in an addressee filed and (2) the monetary amount, so that the user 101 only needs to select the send button (such as the "SEND" button shown in FIG. 8C).

Note that, in some embodiments, the email is generated but not displayed to the user 101, and after the email is generated, the email is sent in the background using the email application without user intervention. In some of these embodiments, once the mobile application 120 has received the monetary amount and the identities of the selected users, the mobile application 120 can automatically cause (e.g., by generating an email or a message and sending the email to the PSS 108) the PSS 108 to perform the payment transfer in the background, without the user actually seeing the email or the message and without the need for the user to instruct an email application to send. In this way, since all the required information is already pre-populated, the mobile application 120 improves the user experience by simplifying the payment transfer process, which only requires the user to initiate the process by hitting the "send" button. The user need not see the background process of an email being generated by, for example, an email application of the mobile device 102.

Note that the proximity-based payment from the mobile device 102 to the mobile device 112 can be initiated in response to the mobile device 102 receiving (610), from the mobile device 112, a request for the payment to the user 111. As mentioned above, the request can include the amount for the payment to the user 111 so that the user 101 does not need to specify the amount.

As mentioned above, in some implementations, the mobile payment application 120 can initiate customer-to-customer payment transfers by means of email. In these implementations, the mobile payment application 120 utilizes a third-party email application (e.g., a Gmail™ application) located on the mobile device 102 to transmit an email message that includes, for example, a payment amount to be transferred to a recipient, the recipient's name, a request for the PSS 108 to transfer the payment amount to the recipient, and a message token.

In one example, the user can enter an amount of payment on either the mobile payment application 120 or in the "SUBJECT" field of the third-party email application. The user can also include a message in the body of the email being drafted on the native email application. A security token can be embedded in the email being drafted and can include information regarding sender email address, device characteristic(s) and/or identifier of the payment sender device, financial account information of the sender user (e.g., debit card account information or credit card account information), or any combination thereof. It is noted that even without the financial account information of the sender user, the email can still be sent from the email application. For example, if no financial account information is embedded in the email, the PSS 108 can send a financial account request email to the sender email address requesting that financial account information be entered. The financial account request email can include a secure link to enter the financial account information, such as a debit card number or a credit card number and associated authentication information (e.g., expire date, ZIP Code, PIN number, or security code). After the user 101 chooses to send the email message, a copy of the message is also sent to the PSS 108. The PSS 108 can analyze the email message, identify the mobile device 102, verify that the email message has been sent from an email address of the user 101, and verify that the mobile device 102 is the only one capable of having produced the email message. Having verified the email message (and the authenticity of the request to transfer money), the PSS 108 initiates the process to transfer the payment amount. However, as said above, the user 101 typically still needs to specify a recipient email address (e.g., such as that of the user 111) in the "TO:" field of the third-party email application.

By adapting the techniques introduced here in these implementations, the above process of initiating payment transfers via email can be further simplified. Before the email (i.e., the payment transaction email) is drafted, the mobile payment application 120 can detect the physical proximity of the mobile device 112, communicate this information regarding its nearby mobile devices to the PSS 108, and receive (425) relevant intelligence related to the nearby mobile devices (such as email address of the user 111) from the PSS 108. Then, the mobile payment application 120 can automatically enter the received information for the user 101 for facilitating the proximity-based payment transfers. For example, the mobile payment application 120 can prompt the user 101 to select from a list of potential receivers (of the payment) that have been detected nearby, and the user 101 is given the choice to select or not select each potential payee. In variations, the mobile application 120 can generate a list of suggested payers based on, for example, the consumer's address book stored in the mobile device 120 and/or the consumer's recently used contacts stored on the mobile device 120. Upon the user 101 indicating that he is satisfied with the selections (e.g., by clicking a "Pay" button provided on a user interface), the mobile payment application 120 can proceed with the next steps of the payment transfer procedures (e.g., launching the third-party email application of the mobile device 120 to draft a payment transaction email).

In accordance with some embodiments, the mobile device 102 can also actively send out request for payment using the proximity-based payment techniques. In the example of FIG. 3, when the user 101 desires to collect payment from the user 121, the mobile device 102 first detects that the mobile device 122 is in proximity (e.g., within the BLE network) in ways described above. Similarly to how the mobile device 102 establishes proximity-based payment with the mobile device 112, the mobile device 102 can also receive, from the mobile device 122, a signal indicating whether the it allows conducting payments with the mobile device 102.

After detecting and verifying the mobile device 122's eligibility for conducting proximity-based payments, the mobile device 102 can enable (710) the user 101 to request a payment from the user 121 by prompting the user 101 to (a) select the mobile device 121 for the payment, and (b) specify an amount for the payment. Adapting the techniques herein, various embodiments of the mobile payment application 120 can let the user 101 enter how many shares of payments in total, and can let the user 101 choose how to split the bill (e.g., by spreading out evenly, by specifying an amount for each share, etc.). Thereafter, the mobile device 102 transmits (720) (e.g., via the BLE network), to the mobile device 122, a request for the payment.

In the case that certain parties in the social dinning event are not eligible for proximity-based payment (e.g., because their mobile devices are not present, or their mobile payment application are shut off), the mobile payment application 120 can still enable the user 101 to request a payment by (a) prompting the user 101 to enter an electronic mail address of such party, and (b) transmitting, to the electronic mail (email) address, a request for the payment. Note that, after the mobile device 102 sends out the request to the mobile device 122, the mobile device 122 can perform proximity-based payment to the mobile device 102 in a similar manner as how the mobile device 102 conducts proximity-based payment to the mobile device 112. For those embodiments that utilize email as means for facilitating the payment transfer, the email addresses associated with those devices that are detected in proximity to the mobile device 102 can be transmitted from the PSS 108 to the mobile device 102. Also, using similar techniques introduced here, the mobile payment application 120 can facilitate payment transfers with (including from and to) multiple other devices that are nearby. For example, depending on the implementation, the mobile payment application 120 can send out a single email to multiple recipients, or separate emails to each individual recipients.

In the aforementioned manner, the techniques introduced here enable one customer to pay another quickly and easily compared to traditional methods. Furthermore, without the prerequisites of a customer having any information (e.g., an email address or a phone number) about another, the introduced techniques enable users to conduct payments with each other as long as they are in physical proximity, thereby greatly reducing the potential for awkward interruptions to the social flow of group events due to bill splitting issues, even in group events that include multiple distinct social circles.

FIG. 9 is a high-level block diagram showing an example of a processing device 900 that can represent any of the devices described above, such as the mobile device 102, the merchant POS system 104, payment service system 108, acquirer system 114, card payment network 116, or issuer system 118. As noted above, any of these systems may include two or more processing devices such as represented in FIG. 9, which may be coupled to each other via a network or multiple networks.

In the illustrated embodiment, the processing system 900 includes one or more processors 910, memory 911, a communication device 912, and one or more input/output (I/O) devices 913, all coupled to each other through an interconnect 914. The interconnect 914 may be or include one or more conductive traces, buses, point-to-point connections, controllers, adapters and/or other conventional connection devices. The processor(s) 910 may be or include, for example, one or more general-purpose programmable microprocessors, microcontrollers, application specific integrated circuits (ASICs), programmable gate arrays, or the like, or a combination of such devices. The processor(s) 910 control the overall operation of the processing device 900. Memory 911 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 911 may store data and instructions that configure the processor(s) 910 to execute operations in accordance with the techniques described above. The communication device 912 may be or include, for example, an Ethernet adapter, cable modem, Wi-Fi adapter, cellular transceiver, Bluetooth transceiver, or the like, or a combination thereof. Depending on the specific nature and purpose of the processing device 900, the I/O devices 913 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium can include recordable/non-recordable media (e.g., read-only memory (ROM), random access memory (RAM), magnetic disk storage media, optical storage media, flash memory devices, etc.).

Note that any and all of the embodiments described above can be combined with each other, except to the extent that it may be stated otherwise above or to the extent that any such embodiments might be mutually exclusive in function and/or structure.

Although the present disclosure has been described with reference to specific exemplary embodiments, it will be recognized that the techniques introduced here are not limited to the embodiments described. Accordingly, the specification and drawings are to be regarded in an illustrative sense rather than a restrictive sense.

What is claimed is:

1. A method for facilitating payments through a wireless communication protocol, the method comprising:
    detecting, by a first mobile device, one or more communication signals broadcast via a wireless network, the communication signals being emitted by one or more corresponding second mobile devices located within a physically proximate distance from the first mobile device;
        wherein a money-transfer application running on the first mobile device enables a first user of the first mobile device to specify one or more second identifiers of one or more second mobile devices of one or more second users for a money transferring process, wherein the first mobile device has received the one or more second identifiers from the one or more second mobile devices;
    determining, by the first mobile device, that the one or more second mobile devices share the wireless network with the first mobile device, each of the one or more second mobile devices having a respective instance of the money-transfer application;
    displaying, by the first mobile device, recipient information comprising identities of the one or more second users of the one or more second mobile devices to enable the user of the first mobile device to select one or more of the second users of the one or more second mobile devices to initiate the money transferring process with the one or more selected users;
    receiving, by the first mobile device, an interaction with a portion of the recipient information, the interaction specifying a money-transfer request, the money-transfer request including: (i) the first user of the first mobile device's selection of the one or more selected users and (ii) an indication of a monetary amount to be respectively requested from or transferred to the one or more selected users;
    wherein at least one of the one or more second users associated with at least one of the one or more second mobile devices has completed a card association process, the card association process comprising associating a payment card with the at least one of the second mobile devices;
    causing, by the first mobile device, based on the money-transfer request, a financial transaction to be initiated between a financial account associated with the user of the first mobile device and one or more financial accounts associated with the one or more selected users of the one or more second mobile devices.

2. The method of claim 1, further comprising:
    receiving, by the PSS, a first geographical location of the first mobile device;
    receiving, by the PSS, a second geographical location of a second mobile device; and
    notifying, by the PSS, the first mobile device that the second mobile device is in proximity when a distance between the first and the second geographical locations is less than a predetermined threshold.

3. The method of claim 1, further comprising:
    receiving, by the PSS, a report from the first mobile device, the report indicating that a second mobile device is detected by the first mobile device as being in physical proximity; and
    receiving, by the PSS and from the first instance of the money-transfer application running on the first mobile device, information identifying the second mobile device.

4. The method of claim 1, wherein the money-transfer request comprises an email that is generated by an email application separate from the first instance of the money-transfer application, the email including an email address associated with the PSS, the email further including an indication of the monetary amount to be transferred to or from the financial account associated with the user of the first mobile device.

5. The method of claim 4, wherein the first instance of the money-transfer application running on the first mobile device brings to foreground an interface of the email application upon receiving the selections of the one or more selected users, and wherein email addresses of the one or more selected users are automatically populated in the generated email.

6. The method of claim 4, wherein the user specifies the monetary amount in a header or a body of the generated email.

7. The method of claim 4, wherein the first instance of the money-transfer application receives the monetary amount in conjunction with the selection of the one or more selected users, and then generates the email based on the selection and the collected monetary amount.

8. The method of claim 4, wherein the email further allows the user to specify additional email addresses by directly inputting the additional email addresses as addressees in the email.

9. The method of claim 4, further comprising:
    upon receiving the email, determining, by the PSS, whether the one or more selected users respectively have associated financial accounts; and
    if a one user among the one or more selected users does not have an associated financial account, sending the one user an email requesting the one user to upload a financial account information.

10. The method of claim 4, further comprising:
    determining a probability of whether the email is authentic by verifying security information, including a user-ID and a domain specified in the email, that is embedded in the email.

11. The method of claim 4, wherein, when the first instance of the money-transfer application has received the monetary amount and the identities of the one or more selected users, the email is automatically generated and sent by the first instance of the money-transfer application in the background using the email application, without the user actually seeing the email and instructing the email application to send.

12. The method of claim 1, wherein, when the user of first mobile device (1) inputs the selections of one or more selected users, (2) indicates the monetary amount for the money transferring process, and (3) instructs to initiate the money transferring process, in the first instance of the money-transfer application, a message is generated by the first instance of the money-transfer application to the PSS via a process initiated by the first instance of the money-transfer application.

13. The method of claim 12, wherein the message is an email generated using an email application of the mobile device separate from the first instance of the money-transfer application, wherein the email is generated with pre-populated information including (1) an email address associated with the PSS in an addressee field and (2) the monetary amount.

14. The method of claim 13, wherein the email is generated but not displayed to the user, and wherein, after the email is generated, the email is sent in the background using the email application without user intervention.

15. The method of claim 12, wherein the message is a short message service (SMS) or a multimedia messaging service (MIMS) message.

16. The method of claim 12, wherein the message is generated based on a proprietary communication protocol that allows the first instance of the money-transfer application to directly communicate the message with the PSS without using another application of the first mobile device.

17. The method of claim 1, further comprising:
identifying, in the one or more devices, a list of devices with users that are socially connected to the user of the first mobile device; and
wherein the displaying the recipient information only provides information regarding identities of the users of the list of devices to the user of the first mobile device.

18. The method of claim 17, wherein identifying the list of devices comprises:
examining a prior history of devices that had conducted the money transferring process with the first mobile device in the past.

19. A method of conducting payments between two or more instances of a transfer application executing on mobile devices, the method comprising:
receiving, by a first instance of the transfer application executing on a first mobile device, information about a financial account of a first user;
transmitting, by the first instance the information about the financial account of the first user together with a first identifier that uniquely identifies one or both of the first instance or the first mobile device to a remote server, so that the first instance is associated with the financial account of the first user;
detecting, by the first instance, a second instance of the transfer application executing on a second mobile device based upon the first instance determining that (1) the signal strength of a short-range radio signal emitted by the second mobile device is above a threshold signal strength and (2) the short-range radio signal is associated with a Bluetooth network shared by the first mobile device and the second mobile device;
receiving, by the first instance, a second identifier from the second instance that uniquely identifies one or both of the second instance or the second mobile device;
transmitting, by the first instance, the second identifier to the remote server, wherein the transmitting occurs in response to detecting the second instance and receiving the second identifier;
receiving, by the first instance, an indication from the remote server that the second instance is eligible to conduct a proximity-based transaction;

receiving, by the first instance from the remote server, electronic identification information associated with the second mobile device, wherein at least some of the electronic identification information is (1) stored in an addressee file associated with the remote server, and (2) sent in response to the remote server receiving the second identifier;
enabling, by the first instance, the first user to initiate a payment to the second user by displaying the electronic identification information on a user interface of the first instance that prompts the first user to (a) select the second user, and (b) approve an amount for the payment to the second user; and
causing, by the first instance, the amount to be transferred from the financial account of the first user to a financial account of the second user.

20. The method of claim 19, further comprising:
receiving, from the second instance, a request for the payment to the second user, wherein the request includes the amount for the payment to the second user.

21. The method of claim 19, further comprising:
detecting, by the first instance, a third instance of the transfer application executing on a third mobile device;
enabling the first user to request a payment from a third user by prompting, via the user interface of the first instance, the first user to (a) select the third user for the payment from the third user, and (b) specify an amount for payment from the third user; and
transmitting, to the third instance, a request for the payment from the third user.

22. A method of conducting payments between two or more instances of a transfer application executing on mobile devices, the method comprising:
detecting, by a first instance of the transfer application executing on a first mobile device, a second instance of the transfer application executing on a second mobile device that is in physical proximity based upon the first instance determining that (1) the signal strength of a short-range radio signal emitted by the second mobile device is above a threshold signal strength and (2) the short-range radio signal is associated with a Bluetooth network shared by the first mobile device and the second mobile device;
receiving, by the first instance, an identifier from the second instance that uniquely identifies one or both of the second instance or the second mobile device;
transmitting, by the first instance, the identifier to a remote server, wherein the transmitting occurs in response to detecting the instance device and receiving the identifier;
receiving, by the first instance, an indication from the remote server that the second instance is eligible to conduct a proximity-based transaction;
receiving, by the first instance, from the remote server, electronic identification information associated with the second mobile device, wherein at least some of the electronic identification information is (1) stored in an addressee file associated with the remote server, and (2) sent in response to the remote server receiving the second identifier;
prompting, by the first instance, by displaying the electronic identification information on a user interface of the first instance, a first user of the first mobile device to confirm a second user of the second mobile device for a payment;

receiving, by the first instance from the first user, an approval of an amount for the payment to the second user; and causing by the first instance, the amount to be transferred from a first financial account associated with the first user to a second financial account associated with the second user.

23. The method of claim 22, further comprising:

receiving a signal indicating whether the second instance allows conducting payments with the first instance.

24. The method of claim 22, further comprising:

measuring a received signal strength of a beacon signal sent from the second mobile device.

25. The method of claim 22, further comprising:

prompting, via the user interface of the first instance, the first user to enter a passcode that authenticates the first mobile device to conduct payments with the second mobile device.

26. The method of claim 22, wherein the causing step comprises:

communicating with the remote server (a) an identifier that uniquely identifies the first instance, (b) an identifier that uniquely identifies the second instance, and (c) the amount to be transferred.

27. The method of claim 22, further comprising:

receiving additional user information associated with the second instance from the remote server; and displaying the additional user information on the user interface of the first instance.

28. The method of claim 22, further comprising:

receiving, from the second instance, a request for the payment to the second user, wherein the request includes the amount for the payment to the second user.

29. The method of claim 22, wherein the second instance is operating in the background.

30. The method of claim 19, wherein the indication from the remote server that the second instance is eligible to conduct the proximity-based payment is based on a determination that the second user has completed a card association process, wherein the card association process comprises associating a payment card with the second instance.

* * * * *